Nov. 3, 1931.     O. NORLING     1,830,208
BANANA STALK STRINGER
Filed Dec. 8, 1930
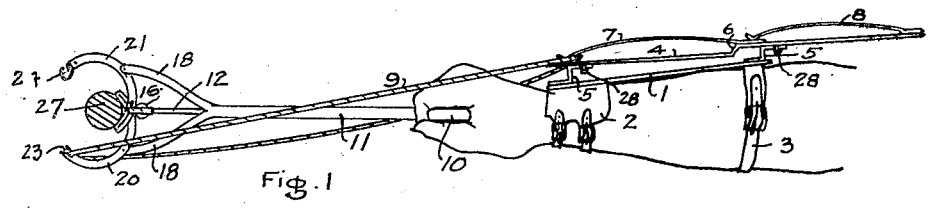
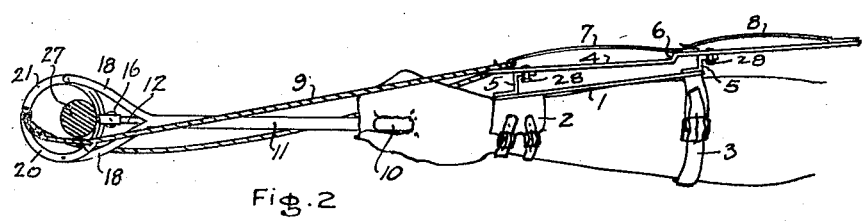
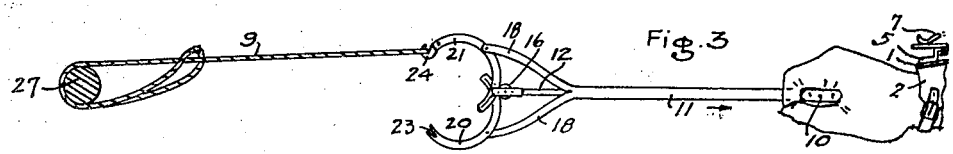
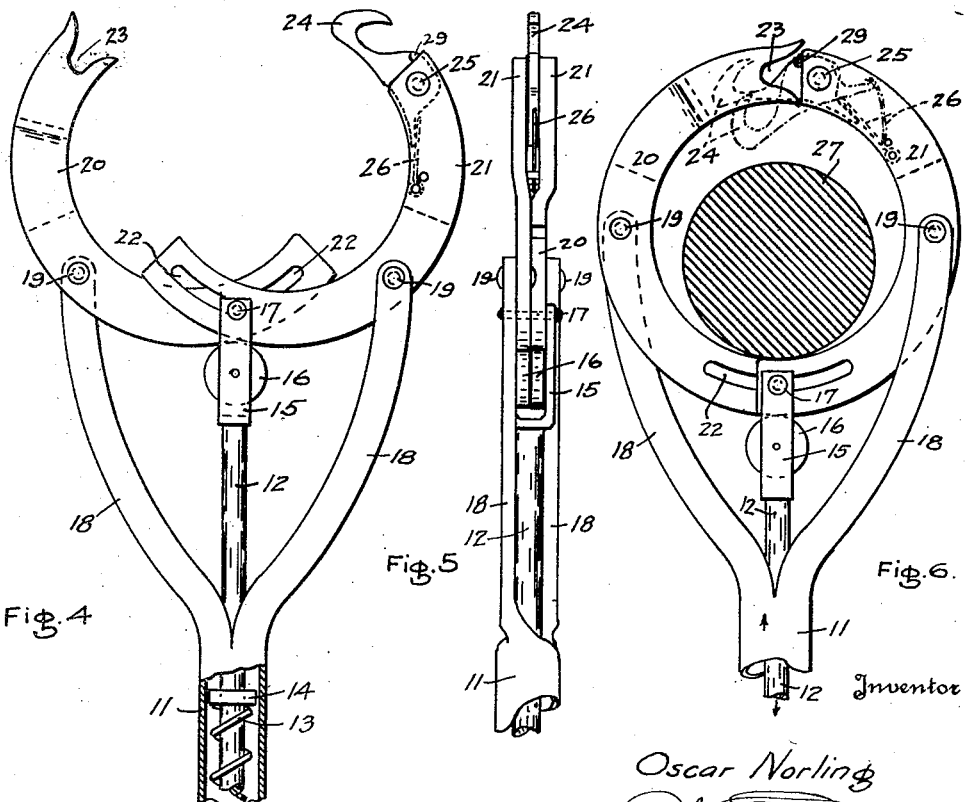
Inventor
Oscar Norling
By
Attorney Patented Nov. 3, 1931

1,830,208

UNITED STATES PATENT OFFICE

OSCAR NORLING, OF TACOMA, WASHINGTON

BANANA STALK STRINGER

Application filed December 8, 1930. Serial No. 500,768.

My invention relates to the handling of bunches of bananas and has special reference to the applying of loops to the stalks thereof.

The objects of my invention are, first, to provide a means for holding a plurality of prepared loops in a convenient position to be inserted in the device for applying them to banana bunch stalks; second, to provide means for keeping said loops from twisting and tangling while they are held in readiness for use; third, to hold the loop which is being applied to a banana bunch stalk in proper position; fourth, to provide a means which will automatically and quickly wind a loop around the stalk and thread it through itself; fifth, to provide such a means which will require only to be pressed on the stalk and immediately withdrawn therefrom to complete the above operation; and sixth, to provide such a means which is strong and rugged in construction; cheap to make, and simple and effective in operation.

I attain these and other objects by the devices, mechanisms, and arrangements illustrated in the accompanying drawings, in which—

Figs. 1, 2 and 3 are general plan views of my invention in use, in which Fig. 1 shows the device at the beginning of the act of pressing the banana bunch stalk, Fig. 2 shows the parts at the end of the pressure, and Fig. 3 shows the device being drawn away from the stalk and the loop being tightened around the stalk; Fig. 4 is a plan view of the operating head of the device in its normal position; Fig. 5 is a side elevation thereof; and Fig. 6 is a plan view thereof, when being operated.

Similar numerals of reference refer to similar parts throughout the several views.

Bunches of bananas are received by the wholesaler packed in cars or ships and must be hung by him in his warehouse for the purpose of further ripening or for display to his customers, or awaiting further shipment. For this purpose he passes a loop around each of the banana stalks, an act known to the trade as "stringing the banana stalks", and hangs them up by means of this loop. This stringing of the stalks is a slow process, when accomplished without tools, and it is for the purpose of reducing the time and labor involved therein that I have produced the following-described apparatus. It is to be understood, however, that this stringing act may take place at any point between the picking of the banana bunch and its final sale to the consumer.

The loop-holder

Referring to Figs. 1 and 2, it will be seen that a loop-holder is strapped to the arm of the operator. This loop-holder comprises a base bar 1, secured to the lower arm of the operator by means of a wrist strap 2 and an arm strap 3; a longer clamp bar 4, secured to said base bar 1 and offset therefrom by means of two lugs 5, said clamp bar 4 being divided into two parts near its center by means of an offset, as shown at 6; a front retainer spring 7, secured to and extending forward from the rear of said offset 6 to the front end of the bar 4; and a rear retainer spring 8, secured to and extending forward from the rear end of the bar 4 to a point over the rear end of the spring 7. The parts 1, 4, 7 and 8 are preferably made of flat metal. The parts 7 and 8 are shaped to permit the loops of rope to lie between them and the bar 4, and to prevent the end loop from falling off said holder accidentally.

This loop-holder is loaded by first passing a loop 9 of rope between the parts 4 and 8, and then passing the other end of the same loop, without twisting, between the parts 4 and 7. Then another loop 9 is similarly placed on the holder and this is repeated until the holder is full. In this way about thirty loops may be placed on the holder and the operator may handle an equal number of bunches of bananas in swift succession before he needs to load up his holder again. In certain cases I prefer to form the attachment between the parts 4 and 5 detachable, by means of a slot in the part 5 hooking over a headed pin 28 on the part 4, so that when one such holder is used, it may be removed and another loaded holder substituted without unfastening the straps 2 and 3.

The loop-holder is operated in the following manner:—The part of the first loop 9 in the rearmost section of the holder is first slipped out from between the parts 4 and 8 and is passed and hooked into the hereinafter described tool head, taking care that it does not become twisted in so doing, that is to say the part of the loop which lies above the spring 8 is brought over the tool to the upper side of the tool head. When the operation is completed (Fig. 3) the part of the loop held between the parts 4 and 7 slips therefrom and slides on and along the first part of the loop as it is pulled taut.

*The tool*

The tool is provided with a hand-grip 10, from which a hollow stem 11 extends. This stem contains a central rod 12, which extends out from its front end under the influence of a compression spring 13 mounted in the stem 11 and engaging a collar 14 on the said rod 12. The end of the rod 12 is provided with a forked head 15 between whose tines are mounted a pair of rollers 16, adapted to engage the rear edges of the hereinafter described jaws, to open the said jaws, and a pin 17 which passes through suitable slots in the said jaws.

The said stem 11 branches out to form two bracket arms 18 at the forward end, each of which carries one of the jaws, pivotally secured thereto by the pivots 19.

The two jaws 20 and 21 are similar in form, except at their outer ends. Each jaw is of a curved or substantially arcuate form of about a semicircle in extent so that when they are closed they form a closed ring around the stem of the banana bunch, and each is provided with a curved slot 22 at their rear ends through which the above pin 17 passes. The jaws 20 and 21 are pivoted near their centers to the arms 18 by the pivots 19. The rear ends of the jaws overlap at all times, thus permitting the pin 17 to pass through both the slots 22 therein.

The outer end of the left-hand jaw 20 is of double construction, with space between at the end, and is provided with a transverse or vertical recess or loop-slot 23, adapted to receive the loop 9 of rope and to hold it as it is passed beside the stalk (Figs. 1 and 2). The right-hand jaw 21 is also of double construction at its outer end and carries a hook 24 pivoted at 25 between the two parts thereof. The hook 24 extends out from the end of the jaw 21 and is adapted to pass between the two parts of the end of the jaw 20. The hook 24 is pressed into its normal position against the stop 29 by means of the spring 26, suitably mounted on the jaw 21, but is permitted to swing inward on its pivot 25 against the action of said spring 26, thereby permitting it to pass behind the loop 9 held in the loop-slot 23, when the jaws 20 and 21 are in closed position (Figs. 2 and 6).

The above-described apparatus is operated in the following manner:—One end of the loop 9 having been placed in the loop-slot 23 at the left of the tool and the other end of the same loop 9 being positioned to the right of the apparatus, being held by the spring 7, as above described, the top side of said loop 9 crosses over the apparatus (Fig. 1). The head of the apparatus is then thrust towards a banana bunch stalk, indicated at 27, in such manner that the jaw 20, carrying the loop 9, passes to the left of the said stalk and the jaw 21 passes to the right thereof. As the inner ends of the jaws 20 and 21 come in contact with the stalk 27, they tend to turn on their pivots 19, against the action of the spring 13 thrusting the rod 12 outward. As they are thus turned the outer ends of the jaws 20 and 21 approach each other until the hook 24 touches the loop 9, held in the loop-holding slot 23, when it moves inward on its pivot 25, against the action of the spring 26, until it passes and lies behind the said loop 9. Then the pressure between the stalk 27 and the inner ends of the jaws 20 and 21 is removed and the jaws are again swung on their pivots 19, thus separating them. In this action the hook 24 engages the loop 9 and removes it from the loop-slot 23 and carries it around the rear side of the stalk 27. As the apparatus is moved further away from the stalk 27, the other end of the loop 9 is pulled off the holder spring 7 and the hook 24 threads the part thereon through the part from the holder 7 and the loop may be drawn taut, thus completing the stringing of the stem.

Having described my invention, what I claim and desire to secure by Letters Patent, is:—

1. In a banana stringer, a loop-holder comprising in combination, a base bar; means to strap said bar to the lower arm of the operator; a clamp bar supported by said base bar; and a spring mounted on said clamp bar and adapted to retain one end of a loop between it and said clamp bar while the other end of the loop is being strung around a banana stalk.

2. In a banana stringer, a loop-holder comprising in combination, a base bar; means to strap said bar to the lower arm of the operator; a clamp bar supported by said base bar; and two springs mounted on said clamp bar, one behind the other, and adapted to together hold a plurality of loops between them and said clamp bar, the front spring being also adapted to retain one end of a single loop between it and said clamp bar while the other end of the said loop is being strung around a banana stalk.

3. In a banana stringer, the combination of a loop-holder adapted to retain a plurality of loops thereon and one end of a single loop; and a tool having one portion adapted to carry the other end of said single loop to one ide of the banana stalk and another portion to receive the said other end of the loop from the first portion, at the rear of the stalk, and to draw it around the other side of the stalk.

4. In a banana stringer, the combination of a loop-holder; a flexible loop held at one end by said loop-holder; a stem held in operative position in relation to said loop-holder; means, mounted on the end of said stem, adapted to encircle the banana stalk; and means on said encircling means, adapted to carry the other end of said loop around the banana stalk and to thread it through itself.

5. In a banana stringer, the combination of a loop-holder; a stem held in operative position in relation to said loop-holder; a pair of jaws pivotally mounted on said stem, adapted to together encircle the banana stalk; a flexible loop held at one end by said loop-holder; means on one said jaw, adapted to carry the other end of said loop a part way around the stalk; and means, on the other jaw, adapted to receive the said other end of the loop and to draw it to the other side of said stalk.

6. In a banana stringer, the combination of a flexible loop; a stem threaded through said loop; and means, mounted on the end of said stem, adapted to carry one end of said loop around the banana stalk.

7. In a banana stringer, the combination of a stem; a pair of jaws pivotally mounted thereon and coacting to encircle the banana stalk when in closed position; spring means engaging said jaws and acting thereon to normally open their ends; means on the open end of one jaw, adapted to carry a cord to one side of and a part way around the banana stalk; means on the open end of the other jaw, adapted to receive said cord from the first said jaw, when the jaws are closed; and means for turning said jaws on their pivots against the action of said spring means, to close said jaws together.

8. In a banana stringer, the combination of a stem; a pair of jaws, each comprising a substantially semicircular arcuate body, pivoted near its center to said stem, said jaws coacting to encircle the banana stalk when in closed position; spring means engaging the inner ends of both said jaws and actuating them outward to separate their outer ends; a recess on the outer end of one said jaw, adapted to receive and carry a cord to one side and a part way around the banana stalk when said jaws are brought to each side thereof and their inner ends are pressed against the stalk to turn the jaws on their pivots to close their outer ends together; a hook pivotally mounted on the outer end of the other said jaw, adapted to pass behind and receive the cord from the first said jaw, when said jaws are closed, and to draw it around and to the other side of said stalk.

9. In a banana stringer, the combination with a stem; a pair of bracket arms extending forwardly and laterally from its forward end; a pair of complementary jaws, each comprising a substantially semicircular arcuate body, pivoted near its center to said bracket arms, said jaws overlapping at their inner ends and coacting to encircle the banana stalk when in closed position; spring means engaging the inner ends of both said jaws and actuating them outward to separate their outer ends; means on the outer end of one said jaw, adapted to carry a cord to one side of and part way around the banana stalk when said jaws are brought to each side thereof and their inner ends are pressed against the stalk to turn said jaws on their pivots, against the action of said spring means, to close their outer ends together; and means on the outer end of the other said jaw, adapted to receive the cord from the first said jaw when said jaws are closed, to draw it around and to the other side of said stalk.

Signed at Tacoma, Wash., this 3rd day of November, 1930.

OSCAR NORLING.